2,800,475

3,4,5-TRIMETHOXYBENZOIC ACID ESTERS OF N - HYDROXYALKYL HYDROXYISOQUINOLINES AND DERIVATIVES THEREOF

Richard A. Robinson, Morton Grove, Ill., assignor to G. D. Searle & Co., Chicago, Ill., a corporation of Illinois No Drawing. Application December 5, 1955,
Serial No. 550,840

10 Claims. (Cl. 260—286)

The present invention is concerned with 3,4,5-trimethoxybenzoic acid esters of N-hydroxyalkyl hydroxyisoquinolines, with polyhydro derivatives thereof, and with non-toxic, acid-addition salts and quaternary ammonium salts related thereto. Specifically, the compounds of the present invention include the organic bases of the structural formula

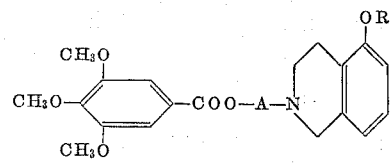

the acid-addition salts and quaternary ammonium salts of the structural formula

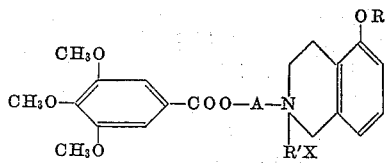

and the quaternary ammonium salts of the structural formula

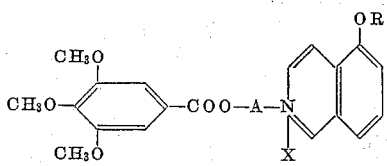

In these structural formulas, A is a lower alkylene radical separating the groups attached thereto by at least 2 carbon atoms, R is a member of the class consisting of hydrogen and the 3,4,5-trimethoxybenzoyl radical, R' is a member of the class consisting of hydrogen and lower alkyl radicals and X is a halogen atom. The radical A can represent a polymethylene radical such as ethylene, trimethylene, tetramethylene, pentamethylene, or hexamethylene. It can also represent one of the radicals isomeric therewith, such as a propylene, butylene, amylene, or hexylene radical. The common feature of these radicals is that they interpose at least 2 carbon atoms between the groups to which they are attached. When R' is a lower alkyl radical, it can represent such groups as methyl, ethyl, and straight- and branched-chain propyl, butyl, amyl, hexyl, heptyl, and octyl.

Suitable starting materials for the manufacture of the compounds of this invention are a haloalkyl ester of 3,4,5-trimethoxybenzoic acid, and 5-hydroxyisoquinoline. For example, reaction of β-bromoethyl 3,4,5-trimethoxybenzoate with 5-hydroxyisoquinoline yields the mono(3,4,5-trimethoxybenzoic acid ester) of N-(β-hydroxyethyl)-5-hydroxyisoquinolinium bromide of the structural formula

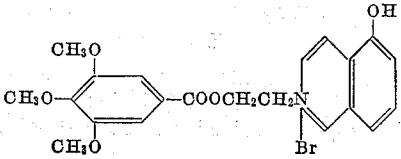

This ester and other esters of this invention are conveniently named by reference to the carboxylic acid and to the alcohol or phenolic alcohol to which they are formally related. It will be apparent to those skilled in the art that chemical names such as the one assigned to the compound of the formula immediately preceding denote, and are descriptive of, chemical structures rather than of reactants or procedures used in the formation of the compounds under consideration.

Reaction of the mono-(3,4,5-trimethoxybenzoic acid ester) of N-(β-hydroxyethyl)-5-hydroxyisoquinolinium bromide with 3,4,5-trimethoxybenzoic acid anhydride yields the di-(3,4,5-trimethoxybenzoic acid ester) of N - (β - hydroxyethyl) - 5 - hydroxyisoquinolinium bromide. The same compound is obtained by the reaction of 5-(3,4,5-trimethoxybenzoyloxy)isoquinoline with the β-bromoethyl ester of 3,4,5-trimethoxybenzoic acid.

Catalytic hydrogenation of either a mono- or a diester of an N-hydroxyalkyl-5-hydroxyisoquinolinium halide results in a fairly rapid absorption of two molecular equivalents of hydrogen and the formation of the corresponding hydrogen halide addition salt of the ester of N - hydroxyalkyl - 5 - hydroxy - 1,2,3,4 - tetrahydroisoquinoline. Such hydrogen halide addition salts have the structural formula

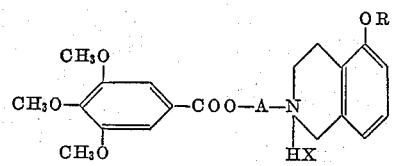

wherein A, R, and X are defined as hereinbefore. The corresponding free bases are conveniently obtained by rendering an aqueous solution or suspension of the acid-addition salt basic and extracting with an organic solvent such as chloroform.

The organic bases described herein form non-toxic salts with a variety of inorganic and strong organic acids including sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride, methyl bromide, methyl iodide,, ethyl chloride, ethyl bromide, ethyl iodide, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of this invention have useful physiological properties. Specifically, they are depressants of the central nervous system and they produce a state of tranquility and ataraxia which is desirable in the treatment of conditions characterized by mental agitation. These compounds are also effective as hypotensive agents and in the reduction of gastric acidity.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

*Example 1*

A solution of 25 parts of 3,4,5-trimethoxybenzoic acid and 65 parts of thionyl chloride is maintained at about 60° C. for 2 hours and is then allowed to stand at room temperature for 16 hours. The thionyl chloride is removed by distillation under reduced pressure. Small portions of benzene are added to the residue and removed by distillation under reduced pressure. A solution of the residue in 27 parts of anhydrous benzene is diluted with petroleum ether, whereupon a crystalline precipitate of 3,4,5-trimethoxybenzoyl chloride separates. This acid chloride is collected on a filter and washed with petroleum ether. A solution of 21 parts of this compound and 12.5 parts of ethylene bromohydrin in 88 parts of anhydrous benzene is heated under reflux for 7 hours and allowed to stand at room temperature for 48 hours. The reaction mixture is diluted with ether and washed with ice water, with several portions of cold, saturated sodium bicarbonate solution, and with several portions of ice water. The ethereal phase is separated, dried and concentrated in a nitrogen atmosphere. Crystallization of the residue from petroleum ether affords the β-bromoethyl ester of 3,4,5-trimethoxybenzoic acid melting at about 63–65° C.

An intimate mixture of 2.9 parts of 5-hydroxyisoquinoline and 6.4 parts of the β-bromoethyl ester of 3,4,5-trimethoxybenzoic acid is fused by heating it at about 120–130° C. The molten mass is then slowly heated to about 160° C. and maintained at this temperature until it completely resolidifies. This material is cooled and ground to a powder or to finely divided crystals in hot acetone. The solid product is collected on a filter, washed with hot acetone and purified by recrystallization from methanol, yielding the mono-(3,4,5-trimethoxybenzoic acid ester) of N-(β-hydroxyethyl)-5-hydroxyisoquinolinium bromide melting at about 228° C. and having the structural formula

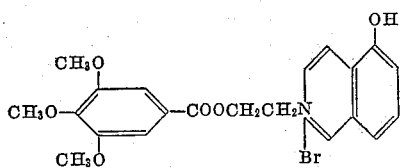

Example 2

A solution of 21 parts of 3,4,5-trimethoxybenzoyl chloride and 16.5 parts of 2-iodoethanol in 88 parts of anhydrous benzene is heated under reflux for 5 hours and allowed to stand at room temperature for 48 hours. The reaction mixture is diluted with ether and washed with ice water, with several portions of cold, saturated sodium bicarbonate solution, and with several portions of ice water. The ethereal phase is separated, dried and concentrated in a nitrogen atmosphere, yielding a residue of the β-iodoethyl ester of 3,4,5-trimethoxybenzoic acid. An intimate mixture of 3.6 parts of this compound and 1.45 parts of 5-hydroxyisoquinoline is gradually heated to about 160° C. and maintained at this temperature for 30 minutes. The partially-cooled reaction mass is digested in hot acetone and the solid product is collected on a filter and washed with acetone. This compound is the mono-(3,4,5-trimethoxybenzoic acid ester) of N-(β-hydroxyethyl)-5-hydroxyisoquinolinium iodide of the structural formula

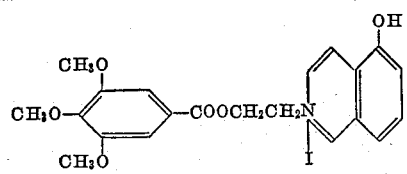

The corresponding isoquinolinium chloride is obtained by substitution of equivalent amounts of 2-chloroethanol and the β-chloroethyl ester of 3,4,5-trimethoxybenzoic acid for the 2-iodoethanol and the β-iodoethyl ester of 3,4,5-trimethoxybenzoic acid in the procedures of this example.

Example 3

A solution of 6.5 parts of the 3,4,5-trimethoxybenzoic acid ester of N-(β-hydroxyethyl)-5-hydroxyisoquinolinium bromide in 240 parts of methanol is added to a suspension of 0.2 part of platinum oxide in 16 parts of ethanol. This reaction mixture is shaken in contact with a hydrogen atmosphere for about 1 hour, or until about 0.056 part of hydrogen (the theoretical amount calculated for 2 molecular equivalents of hydrogen) has been absorbed. The catalyst is removed by filtration and the filtrate is concentrated to about 5–10% of its original volume under reduced pressure, whereupon crystallization of the crude reaction product occurs. This product is collected on a filter and washed with ethanol and acetone. By recrystallization from methanol there is obtained the mono-(3,4,5-trimethoxybenzoic acid ester) of N-(β-hydroxyethyl)-5-hydroxy-1, 2, 3, 4-tetrahydroisoquinoline hydrobromide as white crystals melting at about 199–200° C. This compound has the structural formula

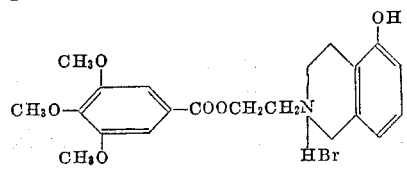

In order to convert this salt to the free base, it is suspended in cold water, slightly more than one equivalent of sodium bicarbonate is added, and the suspension is rapidly extracted with chloroform. The mono-(3,4,5-trimethoxybenzoic acid ester) of N-(β-hydroxyethyl)-5-hydroxy-1,2,3,4-tetrahydroisoquinoline is obtained by evaporation of the chloroform solution. This free base is readily soluble in chloroform but only moderately soluble in benzene or ether.

Example 4

Anhydrous hydrogen chloride is introduced into a solution of the mono-(3,4,5-trimethoxybenzoic acid ester) of N-(β-hydroxyethyl)-5-hydroxy-1,2,3,4-tetrahydroisoquinoline until precipitation of the reaction product is complete. The product is then collected on a filter and washed with ether. It is the mono-(3,4,5-trimethoxybezoic acid ester) of N-(β-hydroxyethyl)-5-hydroxy-1,2,3,4-tetrahydroisoquinoline hydrochloride.

Example 5

A solution of 5 parts of the mono-(3,4,5-trimethoxybenzoic acid ester) of N-(β-hydroxyethyl)-5-hydroxy-1,2,3,4-tetrahydroisoquinoline in 22 parts of chloroform is treated by the addition of 3.5 parts of methyl bromide, and the mixture is maintained in a sealed reaction vessel at 60° C. for 20 hours. The cooled reaction mixture is diluted with ether, and when crystallization of the product is complete it is collected on a filter and washed with ether. This compound is the mono-(3,4,5-trimethoxybenzoic acid ester) of N-(β-hydroxyethyl)-5-hydroxy-1,2,3,4-tetrahydroisoquinoline methobromide. It exhibits a melting range beginning at about 115° C. The structural formula is

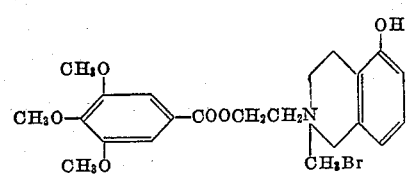

Example 6

A solution of 8 parts of the mono-(3,4,5-trimethoxybenzoic acid ester) of N-(β-hydroxyethyl)-5-hydroxy-1,2,3,4-tetrahydroisoquinoline in 36 parts of chloroform is treated by the addition of 8.7 parts of ethyl iodide, and the mixture is maintained in a sealed reaction vessel at 60° C. for 20 hours. The cooled mixture is diluted with ether, and when precipitation of the product is complete, it is collected on a filter and washed with ether. This compound is the mono-(3,4,5-trimethoxybenzoic acid ester) of N-(β-hydroxyethyl)-5-hydroxy-1,2,3,4-tetrahydroisoquinoline ethiodide having the structural formula

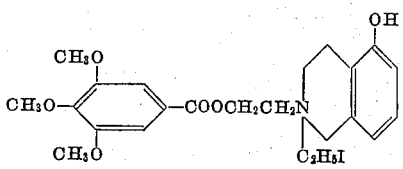

*Example 7*

By the procedure of Example 6, with the substitution of 3.6 parts of ethyl chloride for the ethyl iodide, there is obtained the mono-(3,4,5-trimethoxybenzoic acid ester) of N-(β-hydroxyethyl)-5-hydroxy - 1,2,3,4-tetrahydroisoquinoline ethochloride.

*Example 8*

An intimate mixture of 1.45 parts of 5-hydroxyisoquinoline and 4.1 parts of 3,4,5-trimethoxybenzoic acid anhydride is maintained at 140–150° C., with occasional stirring, for 90 minutes. The partially-cooled reaction mixture is digested in hot isopropyl alcohol until crystallization is complete, after which the solid product is collected on a filter and washed with hot methanol. This compound is 5-(3,4,5-trimethoxybenzoyloxy)isoquinoline melting at about 195–197° C. This product is sparingly soluble in such solvents as water, methanol, ethanol, and acetone. It has the structural formula

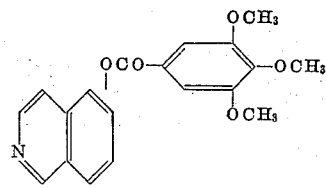

The hydrochloride, prepared by treatment of an ethereal solution of the free base with hydrogen chloride gas, is also difficultly soluble in water.

*Example 9*

An intimate mixture of 6 parts of 5-(3,4,5-trimethoxybenzoyloxy)isoquinoline and 6 parts of the β-bromoethyl ester of 3,4,5-trimethoxybenzoic acid is heated at about 150° C. for 40 minutes. The cooled, resinous mixture is dissolved in acetone, and the acetone solution is filtered from a small amount of insoluble residue. The filtrate is diluted with ether and, when crystallization of the product is complete, it is collected on a filter and thoroughly washed. The crude product obtained in this manner melts over a range beginning at about 120° C. Further purification is achieved by recrystallization from acetone or from aqueous methanol. The crude product can also be purified by partitioning it between chloroform and a 50 volume percent solution of methanol in water, recovering the product from the chloroform phase, and recrystallizing it from aqueous methanol. By these procedures there is obtained the di-(3,4,5-trimethoxybenzoic acid ester) of N - (β-hydroxyethyl)-5-hydroxyisoquinolinium bromide, melting over a range beginning at about 135° C. This compound has the structural formula

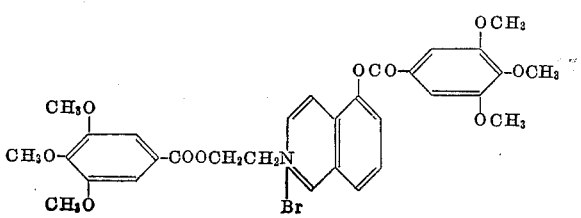

*Example 10*

An intimate mixture of 4.64 parts of the mono-(3,4,5-trimethoxybenzoic acid ester) of N-(β-hydroxyethyl)-5-hydroxyisoquinolinium bromide (described in Example 1) and 4.06 parts of 3,4,5-trimethoxybenzoic acid anhydride is heated until fusion occurs at about 145° C., and is maintained at about 145–150° C. for 10 minutes. The cooled reaction mass is extracted with boiling acetone, and the acetone solution is filtered from about 0.4 part of unreacted mono-(3,4,5-trimethoxybenzoic acid ester) of N-(β-hydroxyethyl)-5-hydroxyisoquinolinium bromide. The solid product which separates when the filtrate is diluted with ether is collected on a filter and washed. Purification, achieved by partitioning the crude product between chloroform and a 50 volume percent solution of methanol in water and recrystallizing the chloroform-soluble fraction from aqueous methanol, yields the di-(3,4,5-trimethoxybenzoic acid ester) of N-(β - hydroxyethyl) - 5 - hydroxyisoquinolinium bromide, identical with the product of Example 9.

*Example 11*

A solution of 11 parts of 3,4,5-trimethoxybenzoyl chloride, 55 parts of anhydrous benzene and 7.5 parts of 3-bromo-1-propanol is heated under reflux for 18 hours. The cooled reaction mixture is diluted with ether and washed with ice water, with several portions of cold, saturated sodium bicarbonate solution, and finally with several portions of ice water. The organic phase is separated and concentrated to dryness in a nitrogen atmosphere. The residue, which consists substantially of the 3-bromopropyl ester of 3,4,5-trimethoxybenzoic acid is washed with petroleum ether. An intimate mixture of 2.4 parts of this product and 2.4 parts of 5-(3,4,5-trimethoxybenzoyloxy)isoquinoline is heated at about 150° C. for 1 hour. The partially-cooled mass is extracted with hot acetone. A small amount of insoluble material is removed by filtration, and the filtrate is diluted with ether until separation of the product is complete. This product is collected on a filter and washed successively with isopropyl alcohol, ethyl acetate and ether. It is the di-(3,4,5-trimethoxybenzoic acid ester) of N-(γ-hydroxypropyl)-5-hydroxyisoquinolinium bromide of the structural formula

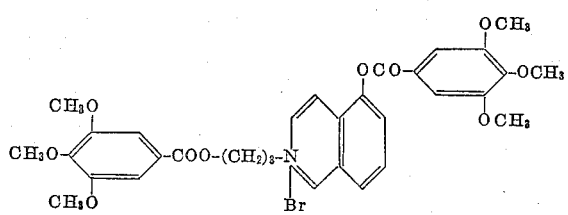

*Example 12*

By the procedure of Example 11, with the substitution of 5.1 parts of 3-chloro-1-propanol for the 3-bromo-1-propanol, the 3-chloropropyl ester of 3,4,5-trimethoxybenzoic acid is obtained. Substitution of 2.06 parts of this compound for the 3-bromopropyl ester of 3,4,5-trimethoxybenzoic acid in the procedure of Example 11 yields the di-(3,4,5-trimethoxybenzoic acid ester) of N-(γ-hydroxypropyl)-5-hydroxyisoquinolinium chloride.

*Example 13*

By the procedure of Example 11, with the substitution of 1-bromo-2-propanol for the 3-bromo-1-propanol, there is obtained the α-methyl-β-bromoethyl ester of 3,4,5-trimethoxybenzoic acid. Substitution of this compound for the 3-bromopropyl ester of 3,4,5-trimethoxybenzoic acid in the procedure of Example 11 yields the di-(3,4,5-trimethoxybenzoic acid ester) of N-(β-hydroxypropyl)-5-hydroxyisoquinolinium bromide. This product is a branched-chain isomer of the product of Example 11.

Example 14

A solution of 22 parts of 3,4,5-trimethoxybenzoyl chloride, 110 parts of anhydrous benzene and 18 parts of 6-bromo-1-hexanol is heated under reflux for 16 hours. The cooled reaction mixture is diluted with ether and washed with ice water, with several portions of cold, saturated sodium bicarbonate solution, and finally with several portions of ice water. The organic phase is separated and concentrated to dryness in a nitrogen atmosphere. The residue, which consists substantially of the 6-bromohexyl ester of 3,4,5-trimethoxybenzoic acid, is washed with petroleum ether. An intimate mixture of 3.75 parts of this compound and 1.45 parts of 5-hydroxyisoquinoline is gradually heated to about 160° C. and maintained at this temperature for 30 minutes. The partially-cooled mass is digested with hot acetone, and the insoluble product is collected and washed. This compound is the mono-(3,4,5-trimethoxybenzoic acid ester) of N-(6-hydroxyhexyl)-5-hydroxyisoquinolinium bromide. It has the structural formula

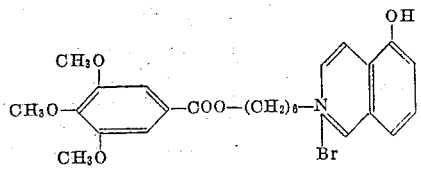

Example 15

A mixture of 11.5 parts of the di-(3,4,5-trimethoxybenzoic acid ester) of N-(β-hydroxyethyl)-5-hydroxyisoquinolinium bromide, 240 parts of methanol, and 0.25 part of platinum oxide is shaken in contact with a hydrogen atmosphere at a pressure of about 35 pounds per square inch for about one hour at 25° C. During this period of time the rate of consumption of hydrogen becomes very slow, after about 2 molecular equivalents of hydrogen has been absorbed. The catalyst is removed by filtration and the filtrate is concentrated to dryness under reduced pressure. Purification of the residue by repeated crystallizations from mixtures of chloroform and ether and from isopropyl alcohol yields the di-(3,4,5-trimethoxybenzoic acid ester) of N-(β-hydroxyethyl)-5-hydroxy-1,2,3,4-tetrahydroisoquinoline hydrobromide as white crystals melting over a range beginning at about 105° C. This compound has the structural formula

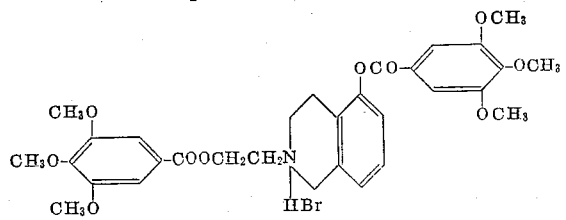

What is claimed is:

1. A member of the class consisting of salts of the structural formulas

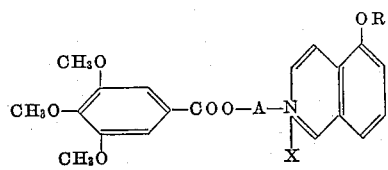

and

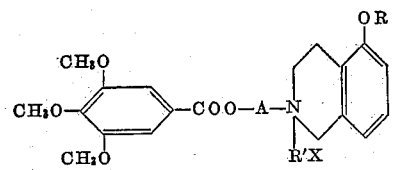

and bases of the structural formula

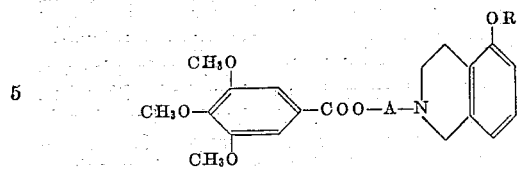

wherein A is a lower alkylene radical separating the groups attached thereto by at least 2 carbon atoms, R is a member of the class consisting of hydrogen and the 3,4,5-trimethoxybenzoyl radical, R' is a member of the class consisting of hydrogen and lower alkyl radicals, and X is a halogen atom.

2. A compound of the structural formula

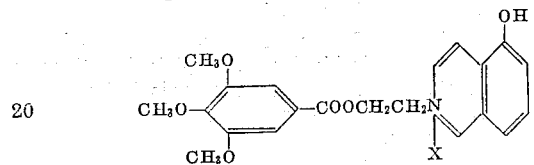

wherein X is a halogen atom.

3. The mono-(3,4,5-trimethoxybenzoic acid ester) of N-(β-hydroxyethyl)-5-hydroxyisoquinolinium bromide.

4. A compound of the structural formula

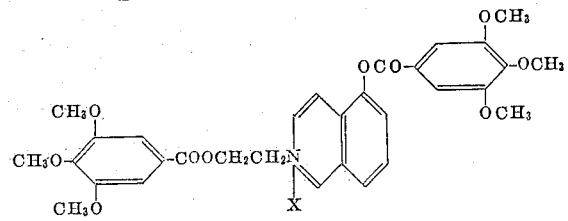

wherein X is a halogen atom.

5. The di-(3,4,5-trimethoxybenzoic acid ester) of N-(β-hydroxyethyl)-5-hydroxyisoquinolinium bromide.

6. A compound of the structural formula

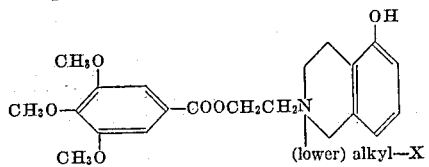

wherein X is a halogen atom.

7. The mono-(3,4,5-trimethoxybenzoic acid ester) of N - (β - hydroxyethyl) - 5 - hydroxy - 1,2,3,4 - tetrahydroisoquinoline methobromide.

8. The mono-(3,4,5-trimethoxybenzoic acid ester) of N - (β - hydroxyethyl) - 5 - hydroxy - 1,2,3,4 - tetrahydroisoquinoline.

9. Hydrogen halide-addition salt of the mono-(3,4,5-trimethoxybenzoic acid ester) of N-(β-hydroxyethyl)-5-hydroxy-1,2,3,4-tetrahydroisoquinoline.

10. The mono-(3,4,5-trimethoxybenzoic acid ester) of N - (β - hydroxyethyl) - 5 - hydroxy - 1,2,3,4 - tetrahydroisoquinoline hydrobromide.

No references cited.